United States Patent [19]
Brent et al.

[11] Patent Number: 5,261,602
[45] Date of Patent: Nov. 16, 1993

[54] PARTIAL OXIDATION PROCESS AND BURNER WITH POROUS TIP

[75] Inventors: Albert Brent, Floral Park, N.Y.; Robert J. Stellaccio, Spring, Tex.; Mitri S. Najjar, Wappingers Falls, N.Y.; Jerrold S. Kassman, Long Beach, Calif.

[73] Assignee: Texaco Inc., White Plains, N.Y.

[21] Appl. No.: 812,310

[22] Filed: Dec. 23, 1991

[51] Int. Cl.$^5$ .............................................. B05B 7/00
[52] U.S. Cl. .............................. 239/132.3; 431/160; 431/187; 165/907; 165/911; 48/DIG. 7; 48/DIG. 8; 110/347; 423/DIG. 6
[58] Field of Search ............ 423/415 A, 655, DIG. 6; 110/347; 239/132.3, 421; 48/DIG. 7, DIG. 8; 165/907, 911; 432/79; 431/160, 187

[56] References Cited

U.S. PATENT DOCUMENTS

| | | | |
|---|---|---|---|
| 3,528,930 | 9/1970 | Schlinger | 252/373 |
| 3,758,037 | 9/1973 | Marion et al. | 239/132.3 |
| 3,831,918 | 8/1974 | Mori et al. | 266/41 |
| 3,847,564 | 11/1974 | Marion et al. | 48/95 |
| 4,007,019 | 2/1977 | Slater et al. | 48/197 R |
| 4,113,445 | 9/1978 | Gettert et al. | 48/197 R |
| 4,222,434 | 9/1980 | Clyde | 165/10 |
| 4,443,230 | 4/1984 | Stellaccio | 48/197 R |
| 4,502,633 | 3/1985 | Saxon | 239/132.3 |
| 4,525,175 | 6/1985 | Stellaccio | 48/86 R |
| 4,525,176 | 6/1985 | Koog et al. | 48/197 R |
| 4,585,055 | 4/1986 | Nakayama et al. | 165/115 |
| 4,644,878 | 2/1987 | Nodd et al. | 110/264 |
| 4,704,971 | 11/1987 | Fleischer et al. | 110/264 |
| 4,752,303 | 6/1988 | Materne et al. | 48/202 |
| 4,775,314 | 10/1988 | Sternling | 431/4 |
| 4,787,443 | 11/1988 | Fukatsu et al. | 165/165 |
| 4,952,218 | 8/1990 | Lipp et al. | 48/86 R |

FOREIGN PATENT DOCUMENTS 60-152895 8/1985 Japan .................... 165/907

Primary Examiner—Gary P. Straub
Assistant Examiner—Timothy C. Vanoy
Attorney, Agent, or Firm—James J. O'Loughlin; Albert Brent

[57] ABSTRACT

A partial oxidation process and a novel burner are provided for simultaneously introducing two or three separate feedstreams into a free-flow partial oxidation gas generator for the production of synthesis gas and fuel gas, or reducing gas. The reactant feedstreams include a liquid hydrocarbonaceous fuel or a pumpable slurry of solid carbonaceous fuel, and a free-oxygen containing gas e.g. air or oxygen. The burner comprises a central conduit and a plurality of spaced concentric coaxial conduits with down-flowing annular passages. A flat annular-shaped disc or cup-shaped porous ceramic or porous metal cooling means of uniform composition, wall thickness and porosity with the various pores interconnecting is attached to the downstream tip of the burner. A controlled amount of liquid coolant under pressure is passed successively through the porous inside surface, porous core and porous outside surface of the cooling means is vaporized. The tip of the burner is thereby cooled. Stress cracking of the burner tip is prevented; and the life of the burner is extended. Further, deposition of ash on the face of the burner is prevented.

17 Claims, 1 Drawing Sheet

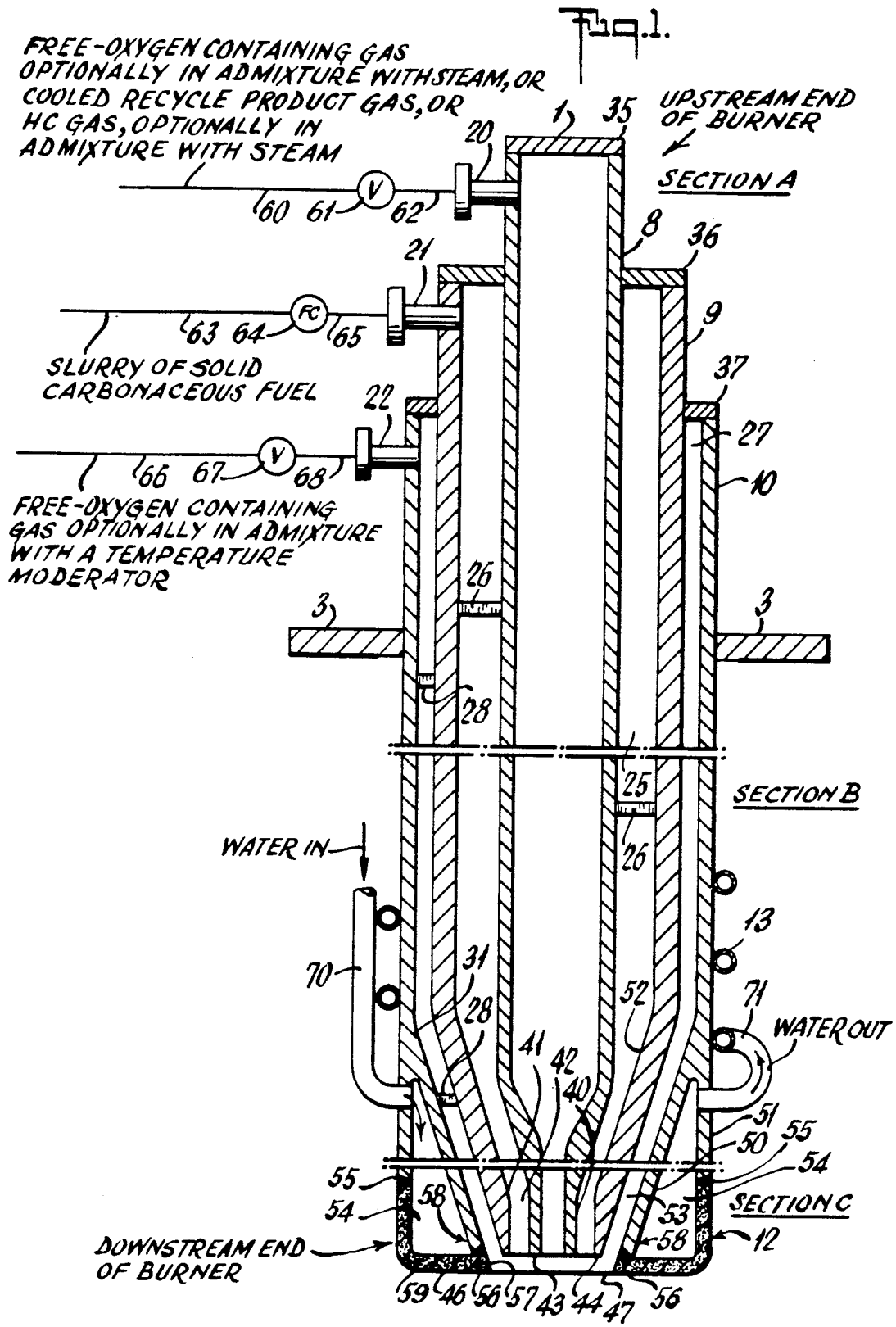

PARTIAL OXIDATION PROCESS AND BURNER WITH POROUS TIP

BACKGROUND OF THE INVENTION

This invention relates to an improved process and burner for the manufacture of gaseous mixtures comprising $H_2$ and CO, e.g. synthesis gas, fuel gas, and reducing gas by the partial oxidation of gaseous hydrocarbons, liquid hydrocarbonaceous fuels, or pumpable slurries of solid carbonaceous fuels in a liquid carrier.

Annular-type burners have been employed for introducing feedstreams into a partial oxidation gas generator. For example, a single annulus burner is shown in coassigned U.S. Pat. No. 3,528,930, and double annulus burners are shown in coassigned U.S. Pat. Nos. 3,758,037 and 3,847,564, and a triple annulus burner has been shown in coassigned U.S. Pat. Nos. 4,443,230 and 4,525,175. Cooling the surface of a burner by conductive heat transfer by a transpiration gas is the subject of U.S. Pat. No. 4,775,314.

A burner is used to simultaneously introduce the various feedstreams into the partial oxidation gas generator, also referred to herein as the gasifier. Recirculating gases that contact the outside surfaces of the burner are at a temperature in the range of about 1700° F. to 3500° F. Burners are commonly cooled to withstand said temperatures by means of cooling channels through which a liquid coolant is passed. One type of channels are coils wrapped around the external diameter of the burner along its length. An annular shaped cooling chamber provides additional cooling at the burner face. Because of the hot corrosive environment in a synthesis gas generator, thermal stress cracks develop in the metal at the tip of the burner. Also, ash deposits on the face of the burner. These problems and others are avoided by the subject improved burner design.

SUMMARY OF THE INVENTION

An improved partial oxidation process and down flowing burner are provided for simultaneously introducing two or three separate reactant feedstreams into a free-flow partial oxidation gas generator for the production of synthesis gas, fuel gas, or reducing gas. The separate feedstreams comprise either (1), (2), and (3) for a three stream burner; or alternatively (2) and (3) for a two stream burner, wherein: (1) is a stream of gaseous material comprising free-oxygen containing gas optionally in admixture with a temperature moderator such as $H_2O$, or a hydrocarbon gas or a portion of recycle product gas optionally in admixture with a temperature moderator such as $H_2O$; (2) is a stream of liquid hydrocarbonaoeous fuel optionally in admixture with a temperature moderator, or a pumpable slurry stream of solid carbonaceous fuel in liquid phase e.g. coal-water; and (3) is a stream of free-oxygen containing gas, optionally in admixture with a temperature moderating gas e.g. steam.

The burner comprises a central conduit and a plurality of spaced concentric coaxial conduits with downflowing annular passages between said conduits wherein said conduits and annular passages are closed at their upstream ends and open at their downstream ends; inlet means connected to the upstream end of each conduit for the passage of a reactant feedstream or liquid coolant; a concentric coaxial nozzle terminating the downstream end of each passage; a porous ceramic or porous metal cooling means in the shape of a thin flat annular-shaped disc or a cup with thin walls is attached to the downstream end of said burner; liquid coolant supply means in communication with said porous cooling means; wherein said porous cooling means comprises a one-piece porous rigid material of uniform composition, wall thickness, and porosity including porous inside and outside surfaces and a porous core with the various pores interconnecting; whereby the flow rate of said liquid coolant through said porous tip cooling means is controllable and wherein said tip cooling means contains a central hole for the free passage of said reactant feedstreams into the reaction zone; whereby said liquid coolant under pressure passes through the pores of said porous cooling means and vaporizes, thereby cooling the tip of said burner.

Atomization and intimate mixing of the liquid hydrocarbonaceous fuel or aqueous slurry of solid carbonaceous fuel with the free-oxygen containing gas mainly takes place in the reaction zone. However, in one embodiment the tips of the central and/or second conduits are retracted upstream from the face of the burner so that some mixing may take place prior to or at the outer conduit exit orifice. In such case the high bulk velocity of the mixture of fuel and free-oxygen containing gas optionally in admixture with a temperature moderator is maintained across the exit of the burner. Advantageously by means of the subject burner, a high velocity stream of free-oxygen containing gas is always available for atomizing and mixing with the fuel stream. The velocity of the free-oxygen containing gas may be maintained at near optimum value to disperse the liquid hydrocarbonaceous fuel or slurry of solid carbonaceous fuel. Further, axial symmetry for the reactant flow pattern is maintained. Deposition of ash on the face of the burner is prevented by the vaporizing water. Stress cracking of the burner tip is prevented; and, the life of the burner is extended.

Another embodiment of the invention relates to the following improved partial oxidation process: in a continuous process for the manufacture of gas mixtures comprising $H_2$, CO, $CO_2$ and at least one material from the group $H_2O$, $N_2$, A, $CH_4$, $H_2S$ and COS by the partial oxidation of a feedstream comprising a pumpable slurry of solid carbonaceous fuel in a liquid carrier or a liquid hydrocarbonaceous fuel optionally in admixture with a temperature moderator and a feedstream of free-oxygen containing gas optionally in admixture with a temperature moderator, said partial oxidation occurring in the reaction zone of a free-flow gas generator at an autogenous temperature in the range of about 1700° F. to 3500° F., and a pressure in the range of about 1 to 300 atmospheres, the improvement which comprises: (1) passing a first reactant feedstream comprising a slurry of solid carbonaceous fuel in a liquid carrier or a liquid hydrocarbonaceous fuel optionally in admixture with a temperature moderator at a temperature in the range of about ambient to 500° F., and a velocity in the range of about 1 to 50 feet per second through the first annular passage of a burner, wherein said burner comprises a central cylindrically shaped conduit having a central longitudinal axis that is coaxial with the central longitudinal axis of the burner; an unobstructed converging exit nozzle that develops into a straight cylindrical portion with a circular exit orifice at the downstream end of the central conduit; closing means attached to the upstream end of said central conduit for closing off same; inlet means in communication with the upstream end of the central conduit for introducing a gaseous feedstream at a velocity in the range of about 20 ft. per second to sonic velocity and comprising free-oxygen containing gas optionally in admixture with a temperature moderator such as $H_2O$, or a hydrocarbon gas or a portion of recycle product gas optionally in admixture with a temperature moderator such as $H_2O$; a second conduit coaxial and concentric with said central conduit along its length, a converging exit nozzle that develops into a straight cylindrical portion with a circular exit orifice at the downstream end of the second conduit; means for radially spacing said central and second conduits and forming therebetween a first annular passage which develops into a right annular passage near the downstream end; closing means attached to said second conduit and first annular passage at their upstream ends for closing off same, said central conduit passing through the upstream closed end of said second conduit and making a gas tight seal therewith, and inlet means in communication with the upstream end of the second conduit for introducing said first reactant feedstream; an outer conduit coaxial and concentric with said second conduit along its length, means for radially spacing said second and outer conduits and forming therebetween a second annular passage that develops into a converging frusto-conical portion towards the downstream end; closing means attached to the second annular passage and outer conduit at their upstream ends for closing off same, said second conduit passing through the upstream closed end of the outer conduit and making a gas tight seal therewith, and inlet means in communication with the upstream end of said outer conduit for introducing a feedstream of free-oxygen containing gas optionally in admixture with a temperature moderator into said second annular passage at a velocity in the range of about 20 ft. per second to sonic velocity; separate feedstream conduits externally connected to each of said inlet means; and flow rate control means in each of said feedstream conduits for separately controlling the flow rate of the feedstream passing through said feedstream conduits; flanging means attached to the outside surface of said outer conduit for aligning the longitudinal central axis of said burner along the central axis of the gas generator while the downstream end of said burner is passed downwardly through a port in the top of the gas generator; a porous ceramic or porous metal cooling means attached to the tip of said burner; liquid coolant supply and removal means in communication with said porous cooling means; wherein said porous cooling means comprises a porous rigid material of uniform composition, wall thickness and porosity including porous inside and outside surfaces and a porous core with the various pores interconnecting; wherein the flow rate of said liquid coolant through said porous tip cooling means is controllable, and said porous tip cooling means contains a central hole for the free-flow of said feedstreams into the reaction zone; wherein at least a portion of said liquid coolant under pressure in the range of about 1 to 600 psig such as about 20 to 200 psig, greater than the pressure in said gasifier passes through the pores in said porous cooling means and vaporizes, thereby cooling the tip of said burner; wherein the tips of said central and second conduits may be retracted upstream from the outer conduit exit orifice, or may terminate in the same plane with the outer conduit exit orifice perpendicular to the longitudinal axis of the burner; and wherein a cylindrical shaped slurry stream with a gaseous core passes through the front portion of the burner and is impacted by a high velocity stream of free-oxygen containing gas optionally in admixture with a temperature moderator and said impact takes place prior to, at, or downstream from the tip of the burner to provide atomization and intimate mixing of the slurry feed with free-oxygen containing gas.

BRIEF DESCRIPTION OF THE DRAWING

In order to illustrate the invention in greater detail, reference is made to the embodiment shown in the drawing wherein;

FIG. 1 is a transverse longitudinal cross-section through the upstream and downstream ends of a preferred embodiment of a three-stream burner showing a porous metal cup-shaped cap attached to the downstream end of the burner.

DESCRIPTION OF THE INVENTION

The present invention pertains to a novel burner for use in the non-catalytic partial oxidation process for the manufacture of synthesis gas, fuel gas, or reducing gas. The burner is preferably used with a reactant fuel stream comprising a liquid hydrocarbonaceous fuel or a pumpable slurry of solid carbonaceous fuel in a liquid carrier. By means of the burner, a reactant feedstream of free-oxygen containing gas with or without admixture with a temperature moderator is mixed with the reactant fuel stream and optionally with a temperature moderator. Atomization and mixing takes place downstream in the reaction zone of a conventional partial oxidation gas generator.

A hot raw gas stream is produced in the reaction zone of the non-catalytic, refractory-lined, free-flow partial oxidation gas generator at a temperature in the range of about 1700° to 3500° F. and a pressure in the range of about 1 to 300 atmospheres, such as about 5 to 250 atmospheres, say about 10 to 100 atmospheres. A typical partial oxidation gas generator is described in coassigned U.S. Pat. No. 2,809,104. The effluent raw gas stream from the gas generator comprises $H_2$ and CO. One or more of the following materials are also present: $CO_2$, $H_2O$, $N_2$, A, $CH_4$, $H_2S$ and COS. Depending on the fuel and operating conditions, entrained matter e.g. particulate carbon-soot, fly-ash, or slag may be produced along with the raw gas stream.

The burner comprises a central cylindrical conduit having a central longitudinal axis which is coaxial with that of the gasifier and a converging nozzle that develops into a right cylindrical section of smaller diameter at the downstream end. Depending on the embodiment, either 1, 2 or 3 cylindrical conduits are radially spaced and are coaxial and concentric with the central conduit along its length. An unobstructed converging exit nozzle is located at the downstream end of the outermost conduit through which a feedstream is discharged. The converging portion of the inside surface of the second conduit and the inside and outside surfaces of the central conduit develop into straight cylindrical portions near their downstream ends. Conventional separators are used for radially spacing the conduits from each other and forming therebetween, depending on the embodiment, either first, or first and second, or first to fifth unobstructed annular passages. For example, alignment pins, fins, centering vanes, spacers and other conventional means are used to symmetrically space the conduits with respect to each other and to hold same in stable alignment with minimal obstruction to the free-flow of the feedstreams.

Near the downstream end of the first annular passage is a converging frusto-conical annular portion that develops into a right cylindrical annular portion. Near the downstream ends of the second and outer annular discharge passages are converging frusto-conical annular portions. The conduits and annular passages are closed off at their upstream ends by conventional means that provide a gastight seal e.g. flanges, plates or screw caps. In a preferred embodiment of a three-stream burner, a flanged inlet is in communication with the upstream end of each conduit for introducing the following feedstreams: (1) central conduit a gaseous material comprising free-oxygen containing gas optionally in admixture with a temperature moderator such as $H_2O$, or a hydrocarbon gas or a portion of recycle product gas optionally in admixture with a temperature moderator such as $H_2O$; (2) second conduit—liquid hydrocarbonaceous fuel optionally in admixture with a temperature moderator e.g. $H_2O$, $CO_2$; or an aqueous slurry of solid carbonaceous fuel; and (3) outer conduit—a high velocity stream of free-oxygen containing gas optionally in admixture with a temperature moderating gas such as $H_2O$. In another embodiment, the two feedstream burner comprises (1) free-oxygen containing gas with or without admixture with a temperature moderating gas stream such as $H_2O$ or $N_2$ passing through the central conduit; and a liquid hydrocarbonaceous fuel optionally in admixture with a temperature moderator e.g. steam and/or an aqueous slurry of solid carbonaceous fuel flowing through the outer annular passage.

Near the downstream end, the second and outer annular passages converge towards the central longitudinal axis at converging angles in the range of about 15° to 60°, such as about 20° to 40°.

For the embodiment shown in FIG. 1, the inside diameters of the discharge orifices for the central, first and/or outer conduits are in a horizontal direction successively larger with respect to each other. The discharge orifices for the central, first and outer conduits may be located in the same horizontal plane at the tip of the burner or retracted upstream from the horizontal circular exit orifice for the outer conduit, which is at the tip (downstream extremity) of the burner.

Thus, the tips of the central and first, conduits may have 0 vertical retraction with respect to the tip for the outer conduit, or they may be progressively, or non progressively retracted upstream.

In this embodiment with retraction of the central and first conduit, a small amount of mixing may take place in the space located at or just prior to the outer conduit exit orifice. Further, a high bulk velocity of the mixture of slurry of solid carbonaceous fuel and free-oxygen containing gas optionally in admixture with temperature moderator is maintained across the exit orifice of the burner.

The velocity of the gaseous streams (with or without admixture with a temperature moderator) passing through the central conduit and the outer annular passages of the subject burner is in the range of about 20 feet per second to sonic velocity, say about 150–750 feet per second. The velocity of the stream of liquid hydrocarbonaceous fuel or liquid slurry of solid carbonaceous fuel passing through the first annular passage is in the range of about 1–50, say about 10–25 feet per second. The velocity of each gaseous stream is at least 56 feet per second greater than the velocity of the liquid slurry stream.

All of the free-oxygen containing gas may be split up between two streams, or remain as a single stream, depending upon the embodiment. Thus, two separate portions of free-oxygen containing gas may be passed through the central conduit and the outer annular passage. Alternatively, all of the free-oxygen containing gas may be passed through either the central conduit or the outer annular passage. In the embodiment where all of the free-oxygen containing gas is passed through the central conduit and the outer annular passages, the total flow of the free-oxygen containing gas through the burner may be split between said conduit and passages as follows (in volume %): central conduit—about 5 to 60, such as about 10 to 20; and outer annular passage—the remainder. A selection of the amount of free-oxygen containing gas passing through each conduit or passage is made so that 100% of the flow of free-oxygen containing gas passes through the burner.

By means of the subject improved burner design thermal stress cracking of the burner tip is avoided and the operating life of the burner is prolonged. A stream of liquid coolant e.g. liquid water or liquid carbon dioxide is used to cool the downstream end of the burner.

A porous ceramic or porous metal plate or cup is used to shield and cool the downstream end of the burner from the hot hostile environment within the gas generator in the vicinity of the burner tip. The burner must withstand contact with recirculating streams of product gas that may comprise mixtures of $H_2$, CO, $CO_2$, $H_2O$, $NH_3$, HCOOH, $H_2S$, COS, particulate carbon, and ash. The temperature in the gasifier may be in the range of about 1700° F. to 3500° F. Cooling of the burner tip is achieved by evaporation of the liquid coolant e.g. water that passes through the porous media. In addition some secondary benefit may be achieved by the water flashing off the outer surface of the porous media. This steam flow may decrease the potential for ash depositing on the burner face. In addition, a more uniform and lower temperature level e.g. about 300° F. to 800° F., say 400° F. may be achieved at the burner tip, thereby reducing thermal fatigue.

In order to maintain the porous ceramic or porous metal plate or cup at the burner tip at a temperature in the range of about 300° F. to 800° F., such as about 400° F. while the temperature in the gasifier surrounding the outside of the burner tip is in the range of about 2300° F. to 2600° F., say about 2500° F., the amount of liquid water in gallons per minute that is vaporized from the external surface of the porous plate or cup at the burner tip per sq. cm of porous surface area will depend on the size of the process burner used, the geometry of the burner tip, and the heat load to the burner tip. For example, for a commercial size burner, a vaporization rate of at least 0.01 gallons of water per minute per square cm of porous surface will accommodate a heat load of 750,000 BTU/Hr. However, the thermal efficiency of the process is improved slightly since the water that enters the gasifier is vaporized by heat that would normally be removed from the system by the conventional water cooling and external heat exchange. Further, the water that enters the process through the porous media does not effect the mixing or concentration of the slurry at the burner tip and therefore does not effect the efficiency of the combustion of the coal slurry-oxygen mixture.

A porous ceramic material for making the annular-shaped disc or cup-shaped member that protects the burner tip is hydrophilic and has a particle size in the range of about 0.01 microns to 100 microns, say about 0.1 to 40 microns and a uniform porosity in the range of about 46.1% to 54.8%, say about 48.5% to 52.3%. While alpha-alumina is the preferred porous ceramic, other porous ceramic-like materials that are suitable include gamma alumina, zirconia, silica, titania, and mixtures thereof. Porous metal materials for making the annular-shaped disc or cup-shaped member has a uniform porosity in the range of about 46.1% to 54.8%, say about 48.5% to 52.3% and include porous stainless steel e.g. Type 300 Series, Nickel Alloys e.g. Inconel, Incoloy, and Cobalt Alloys e.g. Haynes 168, UMCO 50. The porous metal has a particle size in the range of about 0.01 to 100 microns, say about 0.1 to 40 microns.

The wall thickness of the porous plate or cup-shaped member of the burner is in the range of about 0.1 to 3 cm, such as about 0.3 to 1.0 cm.

In a preferred embodiment, liquid water as the liquid coolant enters and contacts the inside surface of the porous ceramic or porous metal plate or cup at a temperature in the range of about 60° F. to 120° F. Most of the liquid coolant leaves the burner after contacting the inside surface of the porous plate or porous cup as a liquid at a temperature in the range of about 75° F. to 135° F. A positive pressure differential on the liquid coolant across the porous media in the range of about 1 to 600 psig, such as about 20 to 200 psig, drives a small portion of the liquid coolant through the porous media. The amount of coolant passing through the porous media can be controlled with a conventional pressure control valve on the exit line of the liquid coolant. Water passing through the porous media can be measured using a circulating water system and a level controlled water tank wherein fresh pure make-up water will be automatically added in response to a low level resulting from water leaving the system by passing through the porous media (see FIG. 1). In this way, adequate cooling control can be maintained at the burner tip for various changes in operation mode. For maximum life of the porous ceramic or porous metal tip cooling means, filtered and demineralized liquid water or purified and distilled water is the preferred liquid coolant. In another embodiment, liquid carbon dioxide is the liquid coolant. In such case, additional CO will be produced in the partial oxidation gas generator.

In the operation of the burner, flow control means may be used to start, stop and regulate the flow of the feedstreams to the passages in the burner. Depending on the embodiment, the feedstreams entering the burner and simultaneously and concurrently passing through at different velocities may be made to impinge and mix with each other just prior to, at, or downstream from the downstream tip of the burner. The impingement of one reactant stream, such as the liquid slurry of solid carbonaceous fuel in a liquid medium with another reactant stream, such as a gaseous stream of free-oxygen containing gas optionally in admixture with a temperature moderator at a higher velocity, causes the liquid slurry to break up into a fine spray. A multiphase mixture is produced in the reaction zone.

The rate of flow for each of the streams of free-oxygen containing gas is controlled by a flow control valve in each feedline to the burner. The rate of flow for the pumpable slurry of solid carbonaceous fuel may be controlled by a speed controlled pump located in the feedline to the burner. Turndown or turnup of the burner is effected by changing the rate of flow for each of the streams while maintaining substantially constant the atomic oxygen to carbon ratio and the $H_2O$ to fuel weight ratio. By adjusting the flow control valve in each feedline for each free-oxygen containing gas stream, a high pressure differential and high velocity is always maintained, even during turnup or turndown. Thus, in the embodiment shown in FIG. 1, a cylindrical shape slurry stream with the gaseous core that is discharged at the front portion of the burner is impacted by a high velocity stream of free-oxygen containing gas prior to, at, or downstream from the tip of the burner. Efficient atomization of the slurry stream and intimate mixing of the slurry and free-oxygen containing gas streams are thereby assured.

Burning of the combustible materials while passing through the burner may be prevented by discharging the reactant feedstreams at the central and annular exit orifices at the tip of the burner with a discharge velocity which is greater than the flame propagation velocity. Flame speeds are a function of such factors as composition of the mixture, temperature and pressure. They may be calculated by conventional methods or determined experimentally.

The subject burner assembly is inserted downward through a top inlet port of a compact unpacked free-flow noncatalytic refractory lined synthesis gas generator, for example as shown in coassigned U.S. Pat. No. 3,544,291. The burner extends along the central longitudinal axis of the gas generator with the downstream end discharging directly into the reaction zone. The relative proportions of the reactant feedstreams and optionally temperature moderator that are introduced into the gas generator are carefully regulated to convert a substantial portion of the carbon in the fuel e.g., up to about 98% or more by weight, to carbon oxides; and to maintain an autogenous reaction zone temperature in the range of about 1700° to 3500° F., preferably in the range of 2300° to 2600° F.

The dwell time in the reaction zone is in the range of about 1 to 10 seconds, and preferably in the range of about 2 to 8. With substantially pure oxygen feed to the gas generator, the composition of the effluent gas from the gas generator in mole percent dry basis may be as follows: $H_2$ 10 to 60; CO 20 to 60; $CO_2$ 5 to 40; $CH_4$ 0.01 to 5; $H_2S + COS$ nil to 5; $N_2$ nil to 5; and A nil to 1.5. With air feed to the gas generator, the composition of the generator effluent gas in mole percent dry basis may be about as follows: $H_2$ 2 to 30; CO 5 to 35; $CO_2$ 5 to 25; $CH_4$ nil to 2; $H_2S + COS$ nil to 3; $N_2$ 45 to 80; and A 0.5 to 1.5. Unconverted particulate carbon-soot, ash, slag, or mixtures thereof are contained in the effluent gas stream.

Pumpable slurries of solid carbonaceous fuels having a dry solids content in the range of about 30 to 75 wt. %, say about 50 to 70 wt. % may be passed through the inlet passage of the first annular discharge passage. The inlet temperature of the slurry is in the range of about ambient to 500° F., but, preferably below the vaporization temperature of the carrier for the solid carbonaceous fuel at the given inlet pressure in the range of about 1 to 300 atmospheres, such as 5 to 250 atmospheres, say about 20 to 100 atmospheres.

The term solid carbonaceous fuels, as used herein to describe suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon soot may be that which is obtained as a byproduct of the subject partial oxidation process, or that which is obtained by burning fossil fuels. The term solid carbonaceous fuel also includes by definition bits of garbage, dewatered sanitary sewage, and semi-solid organic materials such as asphalt, rubber and rubber-like materials including rubber automobile tires.

The solid carbonaceous fuels are preferably ground to a particle size so that 100% of the material passes through an ASTM E 11-70 Sieve Designation Standard 1.40 mm (Alternative No. 14). Further, in one embodiment, at least 80% passes through an ASTM E 11-70 Sieve Designation Standard 425 mm (Alternative No. 40). The moisture content of the solid carbonaceous fuel particles is in the range of about 0 to 40 wt. %, such as 2 to 20 wt. %.

The term liquid carrier, as used herein as the suspending medium to produce pumpable slurries of solid carbonaceous fuels is intended to include various materials from the group consisting of liquid water, liquid hydrocarbonaceous materials, and mixtures thereof. However, liquid water is the preferred carrier for the particles of solid carbonaceous fuel. In one embodiment, the liquid carrier is liquid carbon dioxide. In such case, the liquid slurry may comprise 40-70 wt. % of solid carbonaceous fuel and the remainder is liquid $CO_2$. The $CO_2$-solid fuel slurry may be introduced into the burner at a temperature in the range of about $-67°$ F. to $100°$ F. depending on the pressure.

The term free-oxygen containing gas, as used herein, is intended to include air, oxygen-enriched air, i.e., greater than 21 mole percent oxygen, and substantially pure oxygen, i.e. greater than 95 mole percent oxygen, (the remainder comprising $N_2$ and rare gases).

Simultaneously with the fuel stream, a stream of free-oxygen containing gas is supplied to the reaction zone of the gas generator at a temperature in the range of about ambient to 1500° F., and preferably in the range of about ambient to 300° F., for oxygen-enriched air, and about 500° to 1500° F., for air. The pressure in the partial oxidation reaction zone is in the range of about 1 to 300 atmosphere such as 5 to 250 atmosphere, say 20 to 100 atmospheres. The atoms of free-oxygen plus atoms of organically combined oxygen in the solid carbonaceous fuel per atom of carbon in the solid carbonaceous fuel (O/C atomic ratio) may be in the range of about 0.5 to 1.95.

The term temperature moderator as employed herein includes water, steam, $CO_2$, $N_2$, and a cooled recycle portion of the product gas stream. The temperature moderator may be in admixture with the fuel stream and/or the oxidant stream. However, if a cooled recycle portion of the product gas stream is used it cannot be in admixture with the oxidant stream.

The term hydrocarbon gas as used herein includes methane, ethane, propane, butane, and natural gas.

In one embodiment, the feedstream comprises a slurry of liquid hydrocarbonaceous material and solid carbonaceous fuel; $H_2O$ in liquid phase may be mixed with the liquid hydrocarbonaceous carrier, for example as an emulsion. A portion of the $H_2O$ i.e., about 0 to 25 wt. % of the total amount of $H_2O$ present may be introduced as steam in admixture with the free-oxygen containing gas. The weight ratio of $H_2O$/fuel may be in the range of about 0 to 5, say about 0.1 to 3.

The term liquid hydrocarbonaceous fuel as used herein is intended to include various materials, such as liquefied petroleum gas, petroleum distillates and residues, gasoline, naphtha, kerosine, crude petroleum, asphalt, gas oil, residual oil, tar sand oil and shale oil, coal derived oil, aromatic hydrocarbon (such as benzene, toluene, xylene fractions), coal tar, cycle gas oil from fluid-catalytic-cracking operation, furfural extract of coker gas oil methanol, ethanol and other alcohols and by-product oxygen containing liquid hydrocarbons from oxo or oxyl synthesis, and mixtures thereof.

DESCRIPTION OF THE DRAWING

A more complete understanding of the invention may be had by reference to the accompanying schematic drawing which show the subject invention in detail. Although the drawing illustrates an embodiment of the invention, it is not intended to limit the subject invention to the particular apparatus or materials described.

Referring to FIG. 1, a preferred three-stream burner assembly is depicted. This embodiment shall be referred to herein as embodiment A of FIG. 1. A three-stream burner accommodates, simultaneously, three separate feedstreams. Burner 1 is installed with the downstream end passing downwardly through a port in the top of a free-flow partial oxidation synthesis gas generator (not shown). The longitudinal central axis of burner 1 is preferably aligned along the central axis of the synthesis gas generator by means of mounting flange 3. Burner 1 comprises central, second, and outer concentric cylindrically shaped conduits 8, 9 and 10 respectively. A porous metal coaxial water-cooled tip cup 12 is located at the downstream extremity of the burner. External cooling coils 13 may encircle the downstream portion of burner 1. Flanged inlet pipes 20-22 for the feedstreams to the burner are connected to central conduit 8, and concentric, hollow, cylindrical conduits 9 and 10 respectively.

The burner has two unobstructed annular passages for the free-flow of the feedstreams. The annular passages are formed by radially spacing the three conduits. Thus, first annular passage 25 is located between the outside diameter of central conduit 8 and the inside diameter of second conduit 9. The radial spacing between the central and second conduits is maintained by wall spacers 26. Outer annular passage 27 is located between the outside diameter of second conduit 9 and the inside diameter of outer conduit 10. Wall spacers 28 maintain the radial spacing between the second and third conduits.

The upstream ends of each conduit and annular passage is closed off. Cover plates 35 to 37 seal off the upstream ends of central conduit 8, annular passage 25 and outer annular passage 27, respectively. Conventional means may be used to secure the cover plate to the ends of the conduit e.g., flanging, welding, threading. Gasketing may be used to provide a leak-proof seal.

At the downstream end of the burner, the outside diameter of central conduit 8 and the inside diameter of second conduit 9 are gradually reduced, for example about 30%-50%, and develop into right cylindrical portions 40 and 41, respectively. Right annular passage 42 is located between right cylindrical portions 40 and 41. Tips 44 and optionally 43 of second conduit 9 and central conduit 8, respectively may be progressively retracted upstream from the face of the burner to provide a diverging frusto-conical area 47, as shown in the drawing. Alternatively, tips 43, and 44 may terminate in the same horizontal plane perpendicular to the central longitudinal axis of the burner at the downstream face of the burner. Preferably, the foremost portion of cooling chamber 12 terminates in the same perpendicular plane at the face 46 of the burner.

At point 31 located close to the downstream end of burner 1, outer conduit 10 divides into two branched walls 50 and 51. Branch 50 is frusto-conical shaped, and converges towards the downstream face of the burner. The inside surface of branch wall 50 is separated from the outside surface of the downstream converging portion 52 of second conduit 9 by separating means 28 thereby forming the downstream discharge portion 53 of outer annular passage 27. Porous cup 12 is joined to the tip of burner 1 by welding, brazing, bolting, cementing, or other suitable means so as to provide a hollow leak-proof annular-shaped liquid coolant chamber 54. For example, at point 55, the upper end of the side wall of porous metal cup 12 is circumferentially welded or otherwise joined to the end of branch 51 of outer conduit 10. Joint 55 is cooled and protected by its proximity to liquid coolant pipes 70 and 71. The inside bottom surface 59 of porous cup 12 is circumferentially welded or otherwise sealed around hole 57 to the end of branch wall 50 at point 56.

Embodiment B of FIG. 1 (not shown), is substantially the same as embodiment A but with the exception that joint 56 is retracted upstream from burner face 46 so as to protect the joint from the hot swirling gases at the burner face. In such case, the bottom porous metal wall of tip cup 12 abruptly changes direction at central hole 57 and proceeds in an upward direction to a circumferential joint located at 58. A short frusto-conical shaped porous lip section is thereby formed having a height equal to about ¼ to ½ of the diameter of central hole 57 at the face of the burner. At 58, the upstream end of the porous metal lip section is circumferentially welded to the downstream end of frusto-conical shaped wall 50 to provide a leak-proof seal. The diameter of coaxial hole 57 at the bottom of porous cup 12 permits the free discharge of all of the feedstreams from all of the feedstream passages in the burner.

The feedstreams are introduced into the burner through separate feedlines connected to flanged inlet pipes 20-22 in the upstream end of burner Thus, a gaseous material comprising free-oxygen containing gas optionally in admixture with a temperature moderator such as $H_2O$, or a hydrocarbon gas or a portion of recycle product gas optionally in admixture with a temperature moderator such as $H_2O$ is passed through line 60, flow control valve 61, line 62, and inlet pipe 20. A pumpable liquid phase slurry of solid carbonaceous fuel, for example a coal-water slurry, is passed through line 63, flow control means 64, line 65, and inlet pipe 21. A separate stream of free-oxygen containing gas optionally in admixture with a temperature moderator is passed through line 66, flow control valve 67, line 68, and inlet pipe 22.

A liquid coolant e.g. water is supplied to annular-shaped liquid coolant chamber 54 by way of line 70. The liquid coolant flows through chamber 54 under pressure so that a portion of the liquid coolant flows out through the porous bottom wall and side walls of tip cup 12. The water passing through the walls of cup 12 and on the external surfaces of cup 12 absorbs heat from the cup 12 and is converted to steam thereby cooling the tip of the burner. Additional heat is picked up by conduction as the liquid coolant passes in and out of chamber 54. The liquid coolant leaves coolant chamber 54 through line 71 and is passed through coil 13 which encircles the outside diameter of the burner. In another embodiment, liquid coolant enters coolant chamber 54 by both lines 70 and 71.

Embodiment C (not shown) is substantially the same as embodiment A or B of FIG. 1 except for a flat porous ceramic or porous metal annular-shaped disc which replaces tip cup 12. In such case, branch wall 51 may continue to the end of the burner where it is welded or otherwise attached, for example by bolting with gaskets to provide a leak-proof seal to a flat porous ceramic disc. The end of branch wall 50 may be similarly attached to the flat porous disc. The end of branch wall 50 maybe welded to the top surface and/or inside edge of central hole 57 or the end of the upward extension at 58 of a porous metal tip cooling member.

In another embodiment referred to herein as embodiment D of FIG. 1 but not shown, the burner is adapted to introduce only two feedstreams. For example, second conduit 9, converging portion 52, and inlet 21 are eliminated from the burner shown in FIG. 1. A stream of free-oxygen containing gas optionally in admixture with a temperature moderating gas, e.g. steam is passed through either inlet nozzle 20 or inlet nozzle 22. A stream of liquid fuel e.g. liquid hydrocarbonaceous fuel optionally in admixture with a temperature moderator e.g. steam, or an aqueous slurry of solid carbonaceous fuel is passed through the remaining free passage.

Other modifications and variations of the invention as hereinabove set forth may be made without departing from the spirit and scope thereof, and therefore only such limitations should be imposed on the invention as are indicated in the appended claims.

We claim:

1. In a burner for the partial oxidation of a reactant fuel stream comprising a liquid hydrocarbonaceous fuel or a pumpable slurry of solid carbonaceous fuel in a liquid carrier comprising a central conduit and a plurality of spaced concentric coaxial conduits with downflowing annular passages between said conduits wherein said conduits and annular passages are closed at their upstream ends and open at their downstream ends; inlet means connected to the upstream end of each conduit for the passage of a reactant feedstream or liquid coolant; and a concentric coaxial nozzle terminating the downstream end of each passage; the improvement comprising a porous ceramic or porous metal cooling means attached to the downstream end of said burner; liquid coolant supply and removal means in fluid communication with said porous cooling means; wherein said porous cooling means is cup-shaped or is shaped like a flat annular disc and has a wall thickness in the range of about 0.1 to 3 cm and comprises a porous material of uniform composition, wall thickness, and porosity including porous inside and outside surfaces and a porous core with the various pores interconnecting; whereby the flow rate of said liquid coolant through said porous tip cooling means is controllable and wherein said tip cooling means contains a central hole for the free passage of said reactant feedstreams into the reaction zone; wherein at least a portion of said liquid coolant under pressure passes successively through the porous inside surface, porous core, and porous outside surface of said porous cooling means and vaporizes, thereby cooling the tip of said burner.

2. The burner of claim 1 wherein said porous cooling means is made from a porous ceramic material selected from the group consisting of alpha alumina, gamma alumina, zirconia, silica, titania and mixtures thereof.

3. The burner of claim 2 wherein said porous ceramic cooling means has a uniform porosity in the range of about 46.1 to 54.8% and a thickness of about 0.1 to 3 cm.

4. The burner of claim 1 provided with a positive pressure differential in the range of about 1 to 600 psig to drive the liquid coolant through the porous media.

5. The burner of claim 1 wherein said porous cooling means is made from a porous metal selected from the group consisting of porous stainless steel, nickel alloys such as Inconel and Incoloy, and cobalt alloys such as Haynes 168 and UMCO 50.

6. The burner of claim 5 wherein said porous metal cooling means has a uniform porosity in the range of about 46.1 to 54.8% and a thickness of about 0.1 to 3 cm.

7. The burner of claim 1 wherein said liquid coolant is selected from the group consisting of liquid water and liquid carbon dioxide.

8. The burner of claim 7 wherein said water is filtered and mineral-free or purified and distilled.

9. A burner for simultaneously introducing a stream of free-oxygen containing gas and a pumpable fuel stream downward into the reaction zone of a free-flow partial oxidation gas generator comprising: a coaxial central cylindrically shaped conduit; an unobstructed converging exit nozzle that develops into a straight cylindrical portion with a circular exit orifice at the downstream end of the said central conduit; inlet means in fluid communication with the upstream end of said central conduit for introducing a gaseous feedstream comprising free-oxygen containing gas optionally in admixture with a temperature moderator such as $H_2O$, or a hydrocarbon gas or a portion of recycle product gas optionally in admixture with a temperature moderator such as $H_2O$; a second conduit coaxial and concentric with said central conduit along its length and forming therebetween a first annular passage; a converging exit nozzle that develops into a straight cylindrical portion with a circular exit orifice at the downstream end of said second conduit; inlet means in fluid communication with the upstream end of said second conduit for introducing a feedstream comprising a liquid hydrocarbon fuel optionally in admixture with a temperature moderator or a pumpable slurry of solid carbonaceous fuel; an outer conduit with a downstream circular exit orifice, said outer conduit being coaxial and concentric with said second conduit along its length and forming therebetween a second annular passage; inlet means in fluid communication with the upstream end of said outer conduit for introducing a feedstream of free-oxygen containing gas optionally in admixture with a temperature moderator into said second annular passage; wherein said central, second, and outer conduits and said first and second annular passages are closed at their upstream ends and open at their downstream ends; a porous ceramic or porous metal cooling means attached to the downstream tip of said burner and forming a hollow annular-shaped liquid coolant chamber; liquid coolant supply and removal means in fluid communication with said porous cooling means; wherein said porous cooling means is cup-shaped or is shaped like a flat annular disc and has a wall thickness in the range of about 0.1 to 3 cm and comprises a porous material of uniform composition, wall thickness and porosity including porous inside and outside surfaces and a porous core with the various pores interconnecting; wherein said liquid coolant is liquid water or liquid carbon dioxide; said porous cooling means is a porous ceramic material selected from the group consisting of alpha alumina, gamma alumina, zirconia, silica, titania, and mixtures thereof; or said porous cooling means is a porous metal selected from the group consisting of porous stainless steel, nickel alloy selected from Inconel and Incoloy, and cobalt alloy selected from Haynes 188 and UMCO 50; wherein the flow rate of said liquid coolant through said porous tip cooling means is controllable, and said porous tip cooling means contains a central discharge hole for the freeflow of said feedstreams; wherein at least a portion of said liquid coolant under pressure passes successively through the porous inside surface, porous core, and porous outside surface of said porous cooling means and vaporizes thereby cooling the tip of said burner; wherein the downstream ends of said central and second conduits may be retracted upstream from the outer conduit exit orifice, or may terminate in the same plane with the outer conduit exit orifice perpendicular to the longitudinal axis of the burner; and wherein a cylindrical shaped slurry stream with a gaseous core passes through the front portion of the burner and is impacted by a high velocity stream of free-oxygen containing gas optionally in admixture with a temperature moderator and said impact takes place prior to, at, or downstream from the tip of the burner to provide atomization and intimate mixing of the slurry feed with free-oxygen containing gas.

10. The burner of claim 9 wherein said porous cooling means is a porous metal and is cup-shaped with a coaxial central hole in the bottom to permit the discharge of said feedstreams; the wall of said outer conduit develops into a vertical branch wall and a converging branch wall at the downstream end of the burner; and said porous cup-shaped cooling means is attached to the tip of said burner by welding the upstream end of the vertical wall of said porous tip-cup to the downstream end of said vertical branch wall of said outer conduit, and by welding the bottom of the tip cup or by welding the top of an upwardly extending portion of the bottom of the porous tip-cup surrounding the central hole to the downstream end of said converging branch wall of said outer conduit, thereby providing at the tip of the burner a porous annular-shaped chamber for the liquid coolant.

11. The burner of claim 10 provided with an inlet pipe for introducing said liquid coolant into the upper end of said porous annular-shaped chamber; an outlet pipe for removing said liquid coolant from said porous annular-shaped chamber, and cooling coils encircling the downstream end of said burner and connected to said liquid coolant removal pipe.

12. The burner of claim 9 wherein the downstream tip of the central conduit is retracted upstream from the exit orifice of said converging branch wall.

13. The burner of claim 9 wherein the downstream tip of the second conduit is retracted upstream from the exit orifice of said converging branch wall.

14. The burner of claim 9 wherein the tips of the central and second conduits are progressively retracted upstream from the exit orifice of the converging branch wall so as to provide a diverging frusto-conical discharge zone prior to the downstream tip of the burner.

15. The burner of claim 9 wherein said water is filtered and demineralized or is pure and distilled.

16. A burner for simultaneously introducing a stream of free-oxygen containing gas and a pumpable fuel stream downward into the reaction zone of a free-flow partial oxidation gas generator comprising: a coaxial central cylindrically shaped conduit; an unobstructed converging exit nozzle that develops into a straight cylindrical portion with a circular exit orifice at the downstream end of said central conduit; a first inlet means in fluid communication with the upstream end of said central conduit for introducing a reactant feedstream (1) comprising free-oxygen containing gas optionally in admixture with a temperature moderating gas, or alternatively, a reactant feedstream (2) comprising a liquid hydrocarbonaceous fuel optionally in admixture with a temperature moderator of an aqueous slurry of solid carbonaceous fuel; an outer conduit coaxial and concentric with said central conduit along its length and forming therebetween a first annular passage; a converging exit nozzle that develops into a frusto-conical section with a circular exit orifice at the downstream end of said outer conduit; a second inlet means in fluid communication with the upstream end of the outer conduit for introducing whichever feedstream (1) or (2) that is not introduced through said first inlet means; a porous ceramic or porous metal cooling means which controls the flow rate of a portion of liquid coolant through said porous cooling means, and which contains a central hole for the free passage of said reactant feedstreams and which is provided with porous inside and porous outside surfaces and a porous core, wherein said porous cooling means comprises a porous material of uniform composition, wall thickness, and porosity with the various pores interconnecting; and wherein said porous cooling means is cup-shaped or is shaped like a flat annular disc and has a wall thickness in the range of about 0.1 to 3 cm and is attached to the downstream tip of said burner and forming a hollow annular-shaped liquid coolant chamber; liquid coolant supply and removal means in fluid communication with said porous cooling means whereby said porous cooling means is contacted with at least a portion of said liquid coolant on its inside porous surface and said portion of liquid coolant passes through the inside porous surface, porous core, and outside porous surface of said porous cooling means and vaporizes, thereby cooling the tip of said burner; wherein said liquid coolant is liquid water or liquid carbon dioxide; said porous cooling means is a porous ceramic material selected from the group consisting of alpha alumina, gamma alumina, zirconia, silica, titania, and mixtures thereof; or said porous cooling means is a porous metal selected from the group consisting of porous stainless steel, nickel alloy selected from Inconel and Incoloy, and cobalt alloy selected from Haynes 188 and UMCO 50; wherein the downstream end of said central conduit may be retracted upstream from the outer conduit exit orifice, or may terminate with the outer conduit exit orifice in the same plane perpendicular to the longitudinal axis of the burner; and wherein said reactant feedstreams impact together prior to, at, or downstream from the tip of the burner to provide an atomized and intimately mixed fuel.

17. The burner of claim 16 wherein said porous cooling means is cup-shaped; and said porous cooling means is attached to the tip of said burner so as to provide a leak-proof annular-shaped chamber for said liquid coolant.

* * * * *